United States Patent
Nishikawa et al.

(10) Patent No.: US 9,209,639 B2
(45) Date of Patent: Dec. 8, 2015

(54) STORAGE BATTERY SYSTEM AND METHOD OF CONTROLLING THE SAME

(71) Applicant: Panasonic Corporation, Osaka (JP)

(72) Inventors: Kazufumi Nishikawa, Osaka (JP); Kohji Matsumura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 14/343,184

(22) PCT Filed: Jun. 19, 2013

(86) PCT No.: PCT/JP2013/003820
§ 371 (c)(1),
(2) Date: Mar. 6, 2014

(87) PCT Pub. No.: WO2014/010176
PCT Pub. Date: Jan. 16, 2014

(65) Prior Publication Data
US 2014/0247014 A1 Sep. 4, 2014

(30) Foreign Application Priority Data

Jul. 13, 2012 (JP) ................................. 2012-158050

(51) Int. Cl.
*H02J 7/00* (2006.01)
*H02J 7/02* (2006.01)
(Continued)

(52) U.S. Cl.
CPC .............. *H02J 7/0068* (2013.01); *H01M 10/44* (2013.01); *H01M 10/48* (2013.01); *H02J 7/00* (2013.01);
(Continued)

(58) Field of Classification Search
CPC .............. H02J 7/00; H02J 7/0068; H02J 7/02; H02J 7/34; H02J 7/35; H02J 1/12; H02J 3/00; H02J 9/00; H01M 10/44; H01M 10/48; H02M 3/00; G08B 21/00; G01N 27/416

USPC ......... 320/126, 134, 136, 156, 161, 162, 124; 307/56, 82, 150; 340/636.13, 636.15; 324/433, 434
See application file for complete search history.

(56) References Cited

U.S. PATENT DOCUMENTS 5,945,805 A * 8/1999 Takei ............... G01R 19/16542
320/124
7,525,284 B2 * 4/2009 Iwane ................ G01R 31/3651
320/104
(Continued)

FOREIGN PATENT DOCUMENTS

| JP | 2000-116014 | 4/2000 |
| JP | 2003-134675 | 5/2003 |

(Continued)

OTHER PUBLICATIONS

International Search Report issued Aug. 6, 2013 in International Application No. PCT/JP2013/003820.

*Primary Examiner* — Phallaka Kik
(74) *Attorney, Agent, or Firm* — Wenderoth, Lind & Ponack, L.L.P.

(57) ABSTRACT

A storage battery system includes: electric storage units; and DC-DC converters each provided between one of the electric storage units and a DC bus. Each of the DC-DC converters includes: a voltage sensor for detecting a voltage value at a connection point between the DC bus and the DC-DC converter; a second obtainment unit which obtains voltage values detected by the voltage sensors of the other DC-DC converters; and a control unit which, when a difference value between a statistic of the voltage values obtained by the second obtainment unit and the voltage value detected by the voltage sensor is not less than a predetermined threshold value, changes the voltage value detected by the voltage sensor, and controls an amount of charge in and an amount of discharge from a corresponding one of the electric storage units to approximate the changed voltage value to a predetermined target value.

10 Claims, 8 Drawing Sheets

(51) Int. Cl.
  *H02J 7/34* (2006.01)
  *H01M 10/44* (2006.01)
  *H01M 10/48* (2006.01)
  *H02M 3/00* (2006.01)
  *G08B 21/00* (2006.01)
  *G01N 27/416* (2006.01)
  *H02J 7/35* (2006.01)

(52) U.S. Cl.
  CPC ... *H02J 7/02* (2013.01); *H02J 7/34* (2013.01); *H02J 7/35* (2013.01); *H02M 3/00* (2013.01); *G01N 27/416* (2013.01); *G08B 21/00* (2013.01)

(56) References Cited

U.S. PATENT DOCUMENTS

| | | | | |
|---|---|---|---|---|
| 7,612,542 | B2* | 11/2009 | Eguchi | H02M 3/156 323/222 |
| 8,486,548 | B2 | 7/2013 | Ueda et al. | |
| 2009/0237030 | A1* | 9/2009 | Oh | H02J 7/0016 320/108 |
| 2009/0302803 | A1* | 12/2009 | Oh | H02J 7/0016 320/118 |
| 2010/0136390 | A1 | 6/2010 | Ueda et al. | |
| 2010/0141275 | A1* | 6/2010 | Matsushima | G06F 3/044 324/678 |
| 2010/0253285 | A1* | 10/2010 | Takahashi | H02J 7/0016 320/118 |
| 2012/0176094 | A1 | 7/2012 | Okuda et al. | |
| 2012/0200163 | A1* | 8/2012 | Ito | H01M 10/411 307/77 |
| 2012/0262180 | A1 | 10/2012 | Ishishita | |
| 2013/0187611 | A1* | 7/2013 | Suzuki | B60L 11/1866 320/118 |
| 2015/0028808 | A1* | 1/2015 | Bernardi | B60L 11/1809 320/109 |
| 2015/0165990 | A1* | 6/2015 | Iwashima | G05B 13/02 370/9.1 |

FOREIGN PATENT DOCUMENTS

| | | |
|---|---|---|
| JP | 2003-339118 | 11/2003 |
| JP | 2010-130827 | 6/2010 |
| WO | 2011/077540 | 6/2011 |
| WO | 2012/043134 | 4/2012 |

* cited by examiner

STORAGE BATTERY SYSTEM AND METHOD OF CONTROLLING THE SAME

TECHNICAL FIELD

The present invention relates to a storage battery system for controlling the amount of charge in and the amount of discharge from each of electric storage units electrically connected with a common direct current (DC) bus in parallel and the method of controlling the same.

BACKGROUND ART

In recent years, a storage battery system has been introduced into, for example, ordinary households, office buildings, and factories (e.g., Patent Literature 1). In the storage battery system, strings electrically connected with a common DC bus in parallel are provided. Each of the strings is charged with surplus power supplied from, for example, a solar battery, via the DC bus. The power charged in the strings is supplied via the DC bus to, for example, electrical equipment installed in ordinary households, office buildings, factories, and others.

The strings each include a DC-DC converter and battery packs (storage batteries) which are electrically connected in series. The DC-DC converter includes a voltage sensor for detecting a voltage value at the connection point between the DC-DC converter and the DC bus. The DC-DC converter controls the amount of charge in and the amount of discharge from each of the battery packs, based on the voltage value detected by the voltage sensor.

CITATION LIST

Patent Literature

[PTL 1] Japanese Unexamined Patent Application Publication No. 2010-130827

SUMMARY OF INVENTION

Technical Problem

However, the above conventional storage battery system has the following problem. For example, in the case where a voltage sensor has failed or in the case where a detection error in the voltage sensor is relatively high due to aged deterioration of the voltage sensor, a DC-DC converter cannot properly control the amount of charge in and the amount of discharge from each of battery packs.

Here, the present invention provides a storage battery system capable of properly controlling the amount of charge in and the amount of discharge from each of electric storage units electrically connected with a common DC bus in parallel and the method of controlling the same.

Solution to Problem

To achieve the above object, a storage battery system according to an aspect of the present invention includes: electric storage units electrically connected with a common direct current (DC) bus in parallel, and each including at least one storage battery; and voltage conversion units, each provided between one of the electric storage units and the DC bus, for controlling amounts of charge in and amounts of discharge from the electric storage units, in which each of the voltage conversion units includes: a voltage sensor for detecting a voltage value at a connection point between the DC bus and the voltage conversion unit; a communication unit which communicates with the voltage conversion units other than the voltage conversion unit; an obtainment unit which obtains, via the communication unit, voltage values detected by the voltage sensors of the other voltage conversion units; and a control unit which, when a difference value between (i) a statistic of the voltage values obtained by the obtainment unit and (ii) the voltage value detected by the voltage sensor of the voltage conversion unit is not less than a predetermined threshold value, changes the voltage value detected by the voltage sensor of the voltage conversion unit, and controls an amount of charge in and an amount of discharge from a corresponding one of the electric storage units which is connected to the voltage conversion unit to approximate the changed voltage value to a predetermined target value.

It should be noted that general and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

In a storage battery system according to an aspect of the present invention, even when, for example, a voltage sensor fails or an detection error in the voltage sensor becomes relatively high, if the difference value between the statistic of voltage values and a voltage value detected by the voltage sensor is not less than a predetermined threshold value, it is possible to properly control the amount of charge in and the amount of discharge from each of electric storage units electrically connected to a common DC bus by changing the detected voltage value.

DESCRIPTION OF EMBODIMENTS

Figure 1:
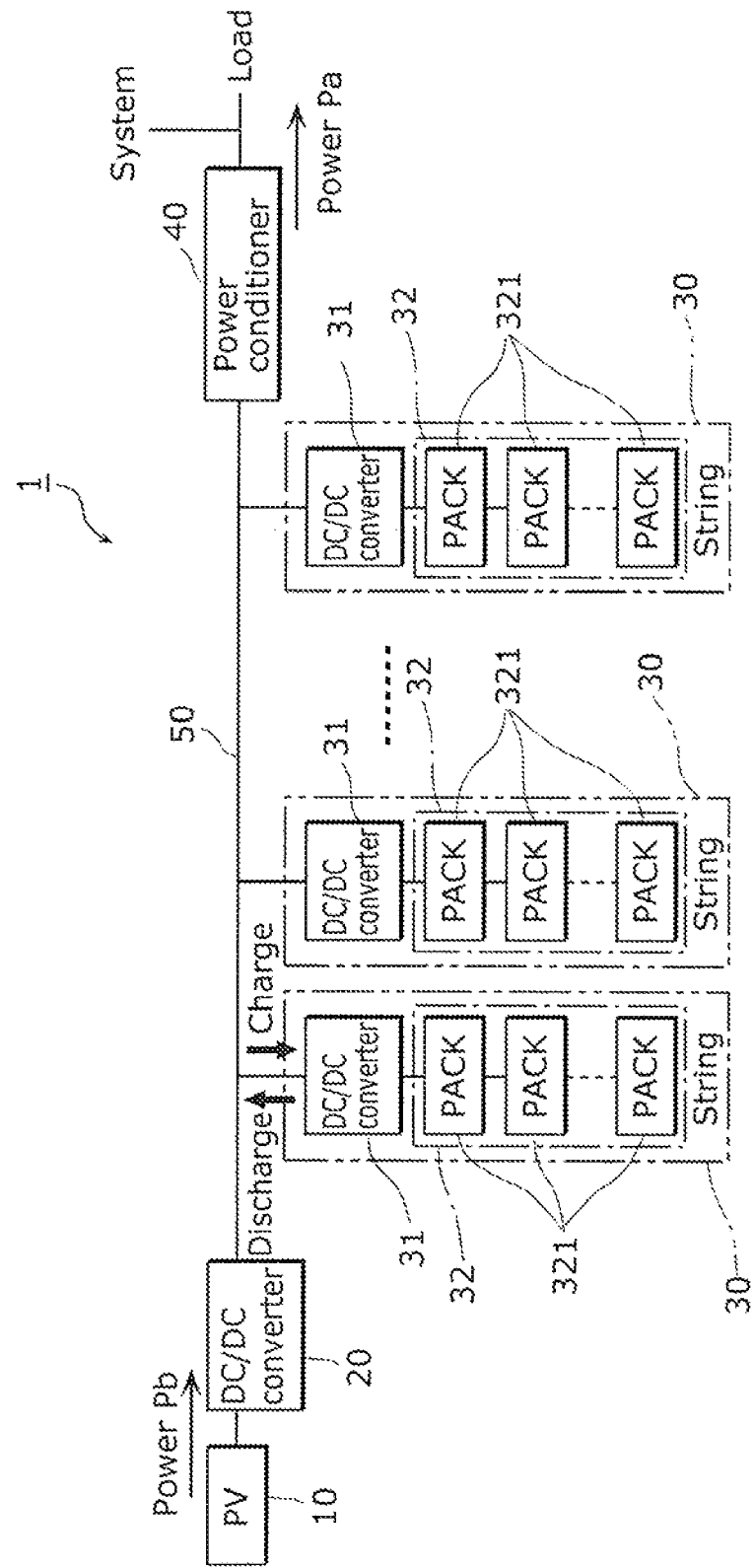
FIG. 1 is a block diagram showing a configuration of the storage battery system according to Embodiment 1.

Underlying Knowledge Form in Basis of the Present Disclosure

The inventors of the present invention found that the storage battery system recited in "Background Art" has the following problem.

When the voltage sensor of a DC-DC converter has failed, the above storage battery system cannot detect a voltage value at the connection point between the DC-DC converter and the DC bus. Therefore, the DC-DC converter cannot control the amount of charge in and the amount of discharge from each of battery packs.

Moreover, in the storage battery system, a detection error in the voltage sensor of a particular DC-DC converter may be relatively high due to, for example, aged deterioration of the voltage sensor. In this case, concentration of charge or discharge to the string corresponding to the particular DC-DC converter may shorten the life of a battery in the string. For instance, discharge from strings starts from the one whose voltage value detected by the voltage sensor is relatively low. Therefore, when the detection error in the voltage sensor of the particular DC-DC converter is relatively high in the minus direction, discharge is concentrated on the string corresponding to the particular DC-DC converter. It should be noted that when the strings are charged, charge is concentrated on a particular string.

To solve such a problem, a storage battery system according to an aspect of the present invention includes: electric storage units electrically connected with a common direct current (DC) bus in parallel, and each including at least one storage battery; and voltage conversion units, each provided between one of the electric storage units and the DC bus, for controlling amounts of charge in and amounts of discharge from the electric storage units, in which each of the voltage conversion units includes: a voltage sensor for detecting a voltage value at a connection point between the DC bus and the voltage conversion unit; a communication unit which communicates with the voltage conversion units other than the voltage conversion unit; an obtainment unit which obtains, via the communication unit, voltage values detected by the voltage sensors of the other voltage conversion units; and a control unit which, when a difference value between (i) a statistic of the voltage values obtained by the obtainment unit and (ii) the voltage value detected by the voltage sensor of the voltage conversion unit is not less than a predetermined threshold value, changes the voltage value detected by the voltage sensor of the voltage conversion unit, and controls an amount of charge in and an amount of discharge from a corresponding one of the electric storage units which is connected to the voltage conversion unit to approximate the changed voltage value to a predetermined target value.

According to this aspect, when a difference value between the statistic of voltage values and a detected voltage value is not less than a predetermined threshold value, even if, for example, the voltage sensor fails or a detection error in the voltage sensor is relatively high, it is possible to properly control the amount of charge in and the amount of discharge from each of electric storage units electrically connected with a common DC bus in parallel by changing the voltage value detected by the voltage sensor.

For example, in a storage battery system according to an aspect of the present invention, when the difference value is not less than the predetermined threshold value, the control unit of each of the voltage conversion units may determine that the voltage sensor of the voltage conversion unit has failed.

According to this aspect, when the difference value is not less than the predetermined threshold value, the control unit can determine that the voltage sensor has failed.

For example, in a storage battery system according to an aspect of the present invention, when determining that the voltage sensor of the voltage conversion unit has failed, the control unit of each of the voltage conversion units may change the voltage value detected by the failed voltage sensor by substituting the statistic for the voltage value detected by the failed voltage sensor.

According to this aspect, when the voltage sensor is determined to have failed, it is possible to temporarily control the amount of charge in and the amount of discharge from each of the electric storage units.

For example, in a storage battery system according to an aspect of the present invention, when the difference value is not less than the predetermined threshold value, the control unit of each of the voltage conversion units may weight the voltage value detected by the voltage sensor of the voltage conversion unit to correct the voltage value to be approximated to the statistic.

According to this aspect, when the difference value is not less than the predetermined threshold value, the control unit can correct the voltage value detected by the voltage sensor. Thus, it is possible to properly control the amount of charge in and the amount of discharge from each of the electric storage units.

For example, in a storage battery system according to an aspect of the present invention, the control unit of each of the voltage conversion units may, when the difference value is not less than a first threshold value, determine that the voltage sensor of the voltage conversion unit has failed, and substitute the statistic for the voltage value detected by the failed voltage sensor, and when the difference value is less than the first threshold value and not less than a second threshold value smaller than the first threshold value, correct the voltage value detected by the voltage sensor of the voltage conversion unit to be approximated to the statistic.

According to this aspect, when the difference value is not less than the first threshold value, the control unit can determine that the voltage sensor has failed. Furthermore, when the difference value is not less than the second threshold value, the control unit can correct the voltage value detected by the voltage sensor. Thus, it is possible to properly control the amount of charge in and the amount of discharge from each of the electric storage units.

For example, a storage battery system according to an aspect of the present invention may include a host controller which transmits a synchronization request signal for requesting the voltage sensor of each of the voltage conversion units to synchronize (i) a timing at which the voltage sensor of the voltage conversion unit detects a voltage value and (ii) a timing at which the voltage sensors of the voltage conversion units other than the voltage conversion unit detect voltage values.

According to this aspect, for example, even when the voltage value in the DC bus varies as time elapses, it is possible to suppress variations in voltage values detected by the voltage sensors of the voltage conversion units by synchronizing timings at which the voltage sensors of the voltage conversion units detect the voltage values.

For example, in a storage battery system according to an aspect of the present invention, the statistic may be an average value.

According to this aspect, the statistic can be used as the average value.

Moreover, a method of controlling a storage battery system according to an aspect of the present invention includes electric storage units electrically connected with a common direct current (DC) bus in parallel, and each including at least one storage battery; and voltage conversion units, each provided between one of the electric storage units and the DC bus, for controlling amounts of charge in and amounts of discharge from the electric storage units. The method includes: detecting a voltage value at a connection point between the DC bus and each of the voltage conversion units by a voltage sensor of the voltage conversion unit; obtaining voltage values detected by voltage sensors of the voltage conversion units other than the voltage conversion unit; and when a difference value between (i) a statistic of the voltage values detected in the obtaining and (ii) the voltage value detected in the detecting is not less than a predetermined threshold value, changing the voltage value detected by the voltage sensor of the voltage conversion unit, and controlling an amount of charge in and an amount of discharge from a corresponding one of the electric storage units which is connected to the voltage conversion unit to approximate the changed voltage value to a predetermined target value.

According to this aspect, when a difference value between the statistic of voltage values and a detected voltage value is not less than a predetermined threshold value, even if, for example, the voltage sensor fails or a detection error in the voltage sensor is relatively high, it is possible to properly control the amount of charge in and the amount of discharge from each of electric storage units electrically connected with a common DC bus in parallel by changing the voltage value detected by the voltage sensor.

Moreover, a storage battery system according to an aspect of the present invention includes: electric storage units electrically connected with a common direct current (DC) bus in parallel, and each including at least one storage battery; voltage conversion units, each provided between one of the electric storage units and the DC bus, for controlling amounts of charge in and amounts of discharge from the electric storage units; voltage sensors each of which detects a voltage value at a connection point between the DC bus and one of the voltage conversion units; and a control unit which controls each of the voltage conversion units, in which when a difference value between (i) a voltage value detected by the voltage sensor corresponding to a particular voltage conversion unit and (ii) a statistic of voltage values detected by the voltage sensors corresponding to the voltage conversion units other than the particular voltage conversion unit is not less than a predetermined threshold value, the control unit changes the voltage value detected by the voltage sensor corresponding to the particular voltage conversion unit, and controls each of the voltage conversion units to approximate the changed voltage value to a predetermined target value.

According to this aspect, when a difference value between the statistic of voltage values and a detected voltage value is not less than a predetermined threshold value, even if, for example, the voltage sensor fails or a detection error in the voltage sensor is relatively high, it is possible to properly control the amount of charge in and the amount of discharge from each of electric storage units electrically connected with a common DC bus in parallel by changing the voltage value detected by the voltage sensor. Furthermore, according to this aspect, the control unit (e.g., host controller) controls each of voltage conversion units. Therefore, it is possible to efficiently control the amount of charge in and the amount of discharge from each of the electric storage units.

A method of controlling a storage battery system according to an aspect of the present invention includes electric storage units electrically connected with a common direct current (DC) bus in parallel, and each including at least one storage battery; and voltage conversion units, each provided between one of the electric storage units and the DC bus, for controlling amounts of charge in and amounts of discharge from the electric storage units. The method includes: detecting a voltage value at a connection point between the DC bus and each of the voltage conversion units by a voltage sensor of the voltage conversion unit; and when a difference value between (i) a voltage value detected by the voltage sensor corresponding to a particular voltage conversion unit and (ii) a statistic of voltage values detected by the voltage sensors corresponding to the voltage conversion units other than the particular voltage conversion unit is not less than a predetermined threshold value, changing the voltage value detected by the voltage sensor corresponding to the particular voltage conversion unit, and controlling each of the voltage conversion units to approximate the changed voltage value to a predetermined target value.

According to this aspect, when a difference value between the statistic of voltage values and a detected voltage value is not less than a predetermined threshold value, even if, for example, the voltage sensor fails or a detection error in the voltage sensor is relatively high, it is possible to properly control the amount of charge in and the amount of discharge from each of electric storage units electrically connected with a common DC bus in parallel by changing the voltage value detected by the voltage sensor. Furthermore, according to this aspect, the control unit (e.g., host controller) controls each of voltage conversion units. Therefore, it is possible to efficiently control the amount of charge in and the amount of discharge from each of the electric storage units.

It should be noted that general and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments will be described with reference to the accompanying Drawings. Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the present invention. Moreover, among the structural elements in the following embodiments, structural elements not recited in any one of the independent claims representing superordinate concept are described as arbitrary structural elements.

Embodiment 1

FIG. 1 is a block diagram showing a configuration of the storage battery system according to Embodiment 1. As shown in FIG. 1, a storage battery system 1 according to the present embodiment includes a photovoltaic (PV) 10, a DC-DC converter 20, strings 30, a power conditioner 40, and a DC bus 50.

The PV 10 is, for example, a solar battery which generates electricity by converting solar energy into electric energy. The input side of the DC-DC converter 20 is electrically connected to the PV 10. Direct-current (DC) power supplied from the PV 10 is outputted to the DC-DC converter 20.

The DC-DC converter 20 converts the voltage of the DC power supplied from the PV 10 into a predetermined voltage. The DC bus 50 is electrically connected to the output side of the DC-DC converter 20. The DC power supplied from the DC-DC converter 20 is outputted to the DC bus 50.

Two or more (e.g., several to more than 10 and less than 20) strings 30 are electrically connected with the DC bus 50 in parallel. Each of the strings 30 has charge and discharge functions. The strings 30 each charge and discharge such that a voltage value at a connection point between the DC bus 50 and the string 30 approximates a target value (e.g., 500 V). It should be noted that when charging, surplus power supplied from the PV 10 is, for example, supplied to each of the strings 30 via the DC bus 50. When discharging, power is supplied from the each of the strings 30 to a load (which will be described later) via the DC bus 50. The configuration of the each of the strings 30 will be described later.

The power conditioner 40 converts DC power supplied from the DC bus 50 into an alternating-current (AC) power. The load such as electrical equipment is electrically connected to the output side of the power conditioner 40. The AC power supplied from the power conditioner 40 is outputted to the load. It should be noted that in the present embodiment, the output side of the power conditioner 40 is interconnected with a commercial power network.

The DC bus 50 electrically interconnects the DC-DC converter 20 and the power conditioner 40, and is a power line which electrically connects the strings 30 in parallel.

The following describes the configuration of the each of the strings 30. The strings 30 each include a DC-DC converter 31 (forming a voltage conversion unit) and an electric storage unit 32 which are electrically connected with the DC bus 50 in series.

The electric storage unit 32, for example, includes two or more (e.g., several to more than 10 and less than 20) battery packs 321 electrically connected in series. The battery packs 321 are storage batteries having charge and discharge functions. It should be noted that the number of the battery packs 321 in the electric storage unit may differ for each string 30. Moreover, in the present embodiment, the electric storage unit 32 includes two or more battery packs 321. However, the electric storage unit 32 may include one battery pack 321.

Figure 2:
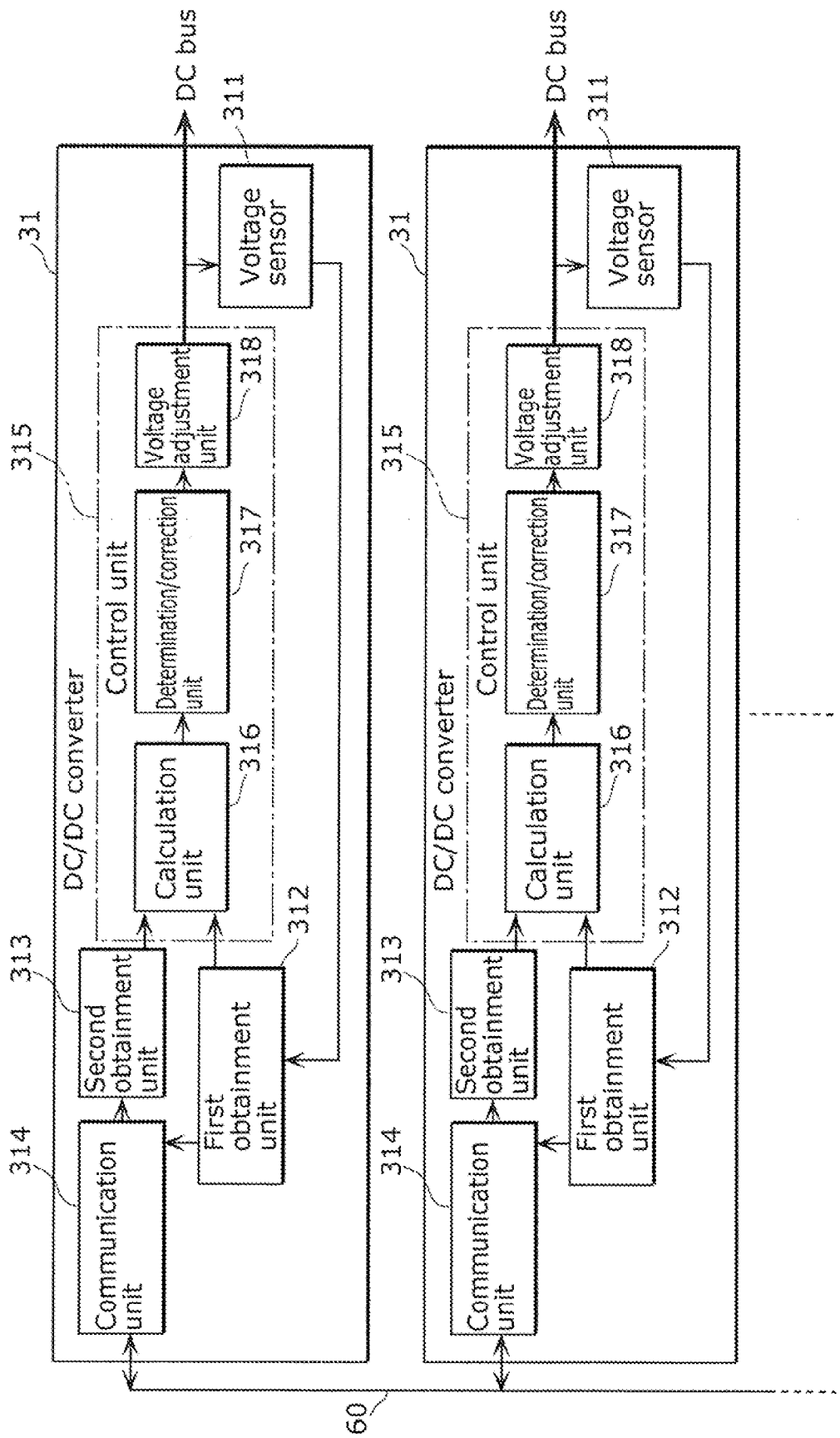
FIG. 2 is a block diagram showing a functional configuration of the DC-DC converter in FIG. 1.

The DC-DC converter 31 is electrically connected between the DC bus 50 and the electric storage unit 32. FIG. 2 is a block diagram showing a functional configuration of the DC-DC converter 31 in FIG. 1. As shown in FIG. 2, each of the DC-DC converters 31 includes a voltage sensor 311, a first obtainment unit 312, a second obtainment unit 313 (which forms an obtainment unit), a communication unit 314, and a control unit 315.

The voltage sensor 311 detects a voltage value at the connection point between the DC-DC converter 31 and the DC bus 50.

The first obtainment unit 312 obtains the voltage value detected by the voltage sensor 311 of the DC-DC converter 31.

The communication unit 314 transmits and receives data between the DC-DC converter 31 and each of the other DC-DC converters 31. Specifically, the communication unit 314 transmits the voltage value obtained by the first obtainment unit 312 of the DC-DC converter 31 to the communication units 314 of the DC-DC converters 31 other than the DC-DC converter 31, and receives voltage values obtained by the first obtainment units 312 of the other DC-DC converters 31. It should be noted that the communication units 314 of the DC-DC converters 31 are connected via a controller area network (CAN) 60 to enable intercommunication.

The second obtainment unit 313 obtains the voltage values received by the communication unit 314, i.e., the voltage values obtained by the first obtainment units 312 of the DC-DC converters 31 other than the DC-DC converter 31.

The control unit 315 includes a calculation unit 316, a determination/correction unit 317, and a voltage adjustment unit 318.

The calculation unit 316 calculates as a statistic, the average value of the voltage values detected by the voltage sensors 311 of all the DC-DC converters 31 including the DC-DC converter 31, based on the voltage values obtained by the first obtainment unit 312 and the second obtainment unit 313. It should be noted that the calculation unit 316 can also calculate, as a statistic, the average value of the voltage values detected by the voltage sensors 311 of the DC-DC converters 31 other than the DC-DC converter 31, based on the voltage values obtained by the second obtainment unit 313.

The determination/correction unit 317 has (i) a failure determination function to determine that the voltage sensor 311 of the DC-DC converter 31 has failed and (ii) a correction function to correct a voltage value detected by the voltage sensor 311 of the DC-DC converter 31.

The following describes the failure determination function of the determination/correction unit 317. The determination/correction unit 317 calculates a difference value between the average value of voltage values calculated by the calculation unit 316 (Vave) and a voltage value obtained by the first obtainment unit 312 of the DC-DC converter 31 (Vs). Subsequently, the determination/correction unit 317 compares the calculated difference value and a first threshold value (which is a predetermined threshold value) (e.g., 5 V). When the calculated difference value is not less than the first threshold value, the determination/correction unit 317 determines that the voltage sensor 311 of the DC-DC converter 31 has failed.

The following describes the correction function of the determination/correction unit 317. The determination/correction unit 317 compares (i) the difference value calculated as above and the first threshold value and (ii) the difference value and a second threshold value (which is a predetermined threshold value) (e.g., 3 V). As a result, when the calculated difference value is not less than the second threshold value and less than the first threshold value, the determination/correction unit 317 weights a voltage value (Vs) detected by the voltage sensor 311 of the DC-DC converter 31 to correct the voltage value (Vs) to be approximated to the average value (Vave). That is, the determination/correction unit 317 changes the voltage value detected by the voltage sensor 311 of the DC-DC converter 31. Specifically, the determination/correction unit 317 corrects the detected voltage value (Vs) to be approximated to the above average value (Vave) by for example, adjusting a gain k and an offset a in Expression 1 below. It should be noted that the second threshold value is smaller than the first threshold value.

$$\text{(Corrected voltage value } Vs') = k \times \text{(Detected voltage value } Vs) + \alpha \qquad \text{(Expression 1)}$$

It should be noted that the determination/correction unit 317 can correct the detected voltage value (Vs) using, for example, the above average value (Vave) instead of the correcting method shown in Expression 1. Specifically, the determination/correction unit 317 calculates an average value Vs1 and an average value Vave 1 during the latest predetermined period (e.g., one minute) for the voltage value (Vs) and the average value (Vave), respectively. Subsequently, the determination/correction unit 317 corrects the detected voltage value (Vs) to be approximated to the above average value (Vave), based on Expression 2 below. It should be noted that in Expression 2, k is a correction coefficient. Here k=0 to 1.

$$\text{(Corrected voltage value } Vs') = \text{(Detected voltage value } Vs) + k \times (\text{Vave1} - Vs1) \qquad \text{(Expression 2)}$$

The voltage adjustment unit 318 controls the amount of charge in and the amount of discharge from each of the battery packs 321 connected to the DC-DC converter 31, based on a voltage value obtained by the first obtainment unit 312 of the DC-DC converter 31. The voltage adjustment unit 318 adjusts the voltage value at the connection point between the DC-DC converter 31 and the DC bus 50 to be approximated to the predetermined target value.

Specifically, when power Pa outputted by the power conditioner 40 is greater than power pb generated by the PV 10, a voltage value in the DC bus 50 falls below the predetermined target value. Therefore, when a voltage value obtained by the first obtainment unit 312 of the DC-DC converter 31 falls below the predetermined target value, the voltage adjustment unit 318 increases the voltage value at the connection point between the DC-DC converter 31 and the DC bus 50 so as to be approximated to the above predetermined target value by controlling the amount of discharge from each of the battery packs 321. Meanwhile, when the power Pa is less than the power Pb, the voltage value in the DC bus 50 is above the predetermined target value. Therefore, when the voltage value obtained by the first obtainment unit 312 of the DC-DC converter 31 is above the predetermined target value, the voltage adjustment unit 318 decreases the voltage value at the connection point between the DC-DC converter 31 and the DC bus 50 so as to be approximated to the above predetermined target value by controlling the amount of charge in each of the battery packs 321.

As described above, when the determination/correction unit 317 determines that the voltage sensor 311 has failed, the voltage adjustment unit 318 does not use the voltage value (Vs) detected by the failed voltage sensor 311. Instead, the voltage adjustment unit 318 substitutes the average value (Vave) calculated by the calculation unit 316 for the voltage value (Vs) detected by the failed voltage sensor 311 (Vs=Vave). That is, the voltage adjustment unit 318 changes the voltage value (Vs) detected by the failed voltage sensor 311. In this way, the voltage adjustment unit 318 temporarily controls the amount of charge in and the amount of discharge from each of the battery packs 321 connected to the DC-DC converter 31 so that the substituted average value (Vave) is approximated to the predetermined target value. That is, when the substituted average value (Vave) falls below the predetermined target value, the voltage adjustment unit 318 controls the amount of discharge from each of the battery packs 321. When the substituted average value (Vave) is above the predetermined target value, the voltage adjustment unit 318 controls the amount of charge in each of the battery packs 321.

Furthermore, as described above, when the voltage value (Vs) is corrected by the determination/correction unit 317, the voltage adjustment unit 318 controls the amount of charge in and the amount of discharge from each of the battery packs 321 connected to the DC-DC converter 31 so that the voltage value corrected by the determination/correction unit 317 (Vs') is approximated to the predetermined target value. That is, when the corrected voltage value (Vs') falls below the predetermined target value, the voltage adjustment unit 318 controls the amount of discharge from each of the battery packs 321. When the corrected voltage value (Vs') is above the predetermined target value, the voltage adjustment unit 318 controls the amount of charge in each of the battery packs 321.

Figure 3:
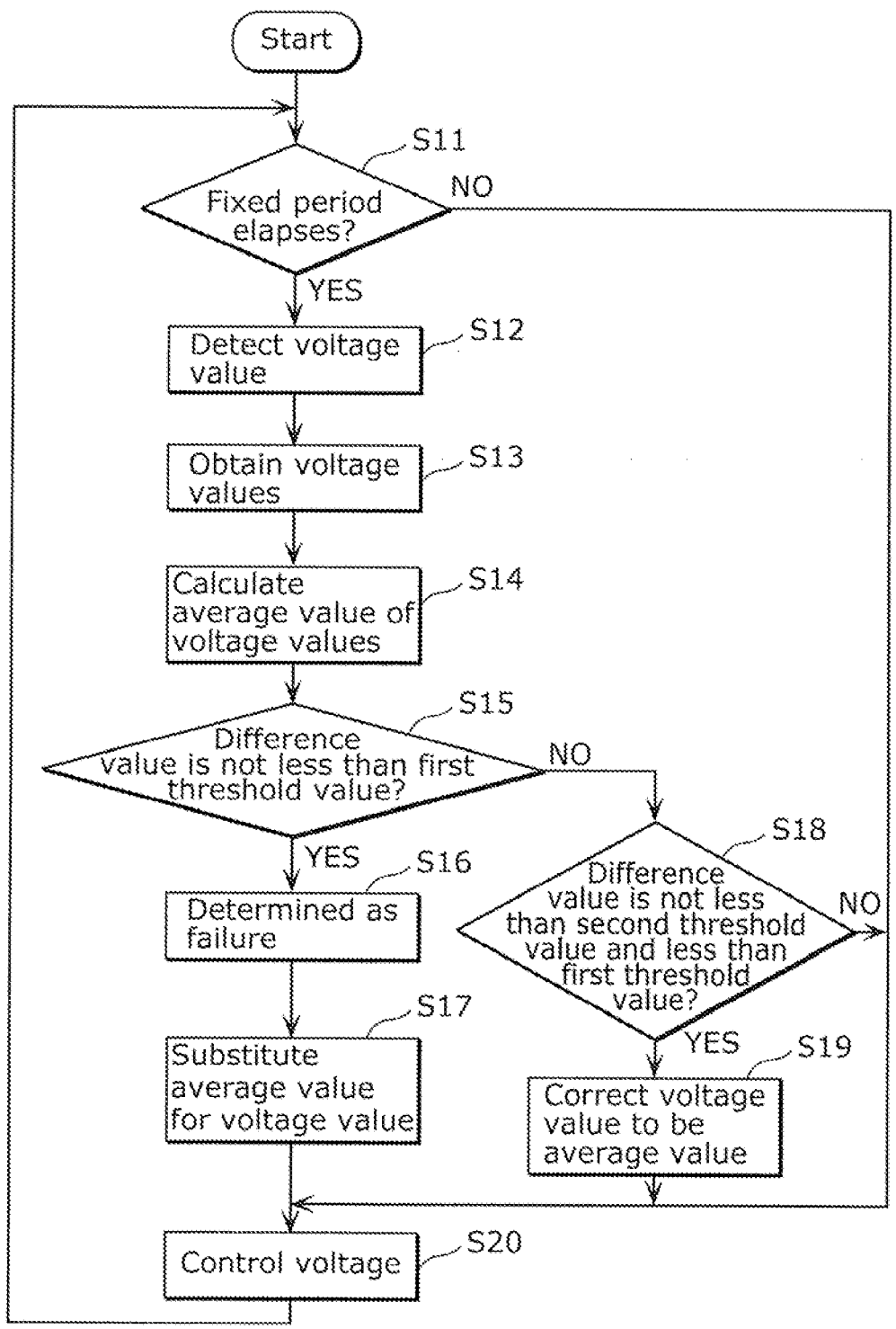
FIG. 3 is a flowchart showing the procedure of the method of controlling the storage battery system according to Embodiment 1.

The following describes the procedure of the method of controlling the storage battery system 1 in the present embodiment. FIG. 3 is a flowchart showing the procedure of the method of controlling the storage battery system according to Embodiment 1.

The detection of a voltage value by the voltage sensor 311 is performed every fixed period (e.g., every second). When the fixed period elapses (Yes in S11), the voltage sensor 311 of each of the DC-DC converters 31 detects a voltage value at the connection point between the DC-DC converter 31 and the DC bus 50 (detection step) (S12). The first obtainment unit 312 of each of the DC-DC converters 31 obtains the voltage value detected by the voltage sensor 311 of the DC-DC converter 31. Furthermore, the second obtainment units 313 of each of the DC-DC converters 31 obtains voltage values obtained by the first obtainment units 312 of the DC-DC converters 31 other than the DC-DC converter 31 (obtainment step) (S13).

The calculation unit 316 of each of the DC-DC converters 31 calculates the average value of the voltage values detected by the voltage sensors 311 of all the DC-DC converters 31, based on the voltage values obtained by the first obtainment unit 312 and the second obtainment unit 313 (S14). The determination/correction unit 317 calculates a difference value between the calculated average value and a voltage value obtained by the first obtainment unit 312 of the DC-DC converter 31.

When the difference value is less than the second threshold value (No in step 15 and No in S18), the voltage adjustment unit 318 controls the amount of charge in and the amount of discharge from each of the battery packs 321 connected to the DC-DC converter 31, based on the voltage value obtained by the first obtainment unit 312 of the DC-DC converter 31 (S20). In this way, the voltage adjustment unit 318 adjusts the voltage value at the connection point between the DC-DC converter 31 and the DC bus 50 to be approximated to the predetermined target value.

Meanwhile, when the difference value is not less than the first threshold value (Yes in S15), the determination/correction unit 317 determines that the voltage sensor 311 of the DC-DC converter 31 has failed (S16). The voltage adjustment unit 318 substitutes the average value calculated by the calculation unit 316 for the voltage value detected by the failed voltage sensor 311 (S17). The voltage adjustment unit 318 temporarily controls the amount of charge in and the amount of discharge from each of the battery packs 321 connected to the DC-DC converter 31, based on the substituted average value (control step) (S20).

Furthermore, when the difference value is not less than the second threshold value and less than the first threshold value (No in S15 and Yes in S18), the determination/correction unit 317 corrects the voltage value detected by the voltage sensor 311 of the DC-DC converter 31 to be approximated to the average value (S19). This allows the voltage adjustment unit 318 to control the amount of charge in and the amount of discharge from each of the battery packs 321 connected to the DC-DC converter 31, based on the corrected average value (control step) (S20).

Every time the fixed period elapses, each step of S12 to S20 described above is performed. In S13, it is set that the voltage value detected by the failed voltage sensor 311 is not received by the communication units 314 of the other DC-DC converters 31. By so doing, the calculation units 316 of the other DC-DC converters 31 do not use the voltage value detected by the failed voltage sensor 311 when calculating the average value. This can improve the calculation accuracy of the average value. It should be noted that it is also possible to set so that the voltage value detected by the failed voltage sensor 311 is received by the communication units 314 of the other DC-DC converters 31.

As described above, the following advantage can be obtained from the storage battery system 1 and the method of controlling the same according to the present embodiment. For example, even if the voltage sensor 311 has failed or a detection error in the voltage sensor 311 is relatively high, it is possible to properly control the amount of charge in and the amount of discharge from each of the battery packs 321 by changing a voltage value detected by the voltage sensor 311, based on a difference value between the average value of voltage values and the detected voltage value.

Modification 1 of Embodiment 1

A cycle (control cycle) by which the voltage adjustment unit 318 controls the amount of charge in and the amount of discharge from each of the battery packs 321 can be, for example, a cycle which will be described as below.

During the time until the voltage sensor 311 is determined to have failed (i.e., while the voltage sensor 311 is normally working), the first obtainment unit 312 and the second obtainment unit 313 each obtain a voltage value by a first cycle (e.g., 1 millisecond). Here, the voltage adjustment unit 318 controls, by the first cycle, the amount of charge in and the amount of discharge from each of the battery packs 321 connected to the DC-DC converter 31.

Meanwhile, after the voltage sensor 311 is determined to have failed, the calculation unit 316 updates a statistic by a second cycle (e.g., 1 second) longer than the first cycle. Here, the voltage adjustment unit 318 controls, by the second cycle, the amount of charge in and the amount of charge from each of the battery packs 321 connected to the DC-DC converter 31. Here, the control cycle of the voltage adjustment unit 318 is longer than the control cycle when the voltage sensor 311 works normally. However, it is possible to temporarily control the amount of charge in and the amount of discharge from each of the battery packs 321.

Modification 2 of Embodiment 1

When the determination/correction unit 317 determines that the voltage sensor 311 has failed, the control unit 315 can also notify a device provided outside of the DC-DC converter 31 of information indicating that the voltage sensor 311 has failed (e.g., sound information or image information).

For example, when the determination/correction unit 317 determines that the voltage sensor 311 has failed, the control unit 315 notifies a display unit installed in the storage battery system 1 such as a liquid crystal panel of the information. In this case, the display unit displays information indicating which one of the DC-DC converters 31 has the failed voltage sensor 311. This allows a user of the storage battery system 1 to recognize that the voltage sensor 311 has failed. It should be noted that a speaker installed in the storage battery system 1 may output an alarm at the same time when the information is displayed in the display unit.

Alternatively, when the determination/correction unit 317 determines that the voltage sensor 311 has failed, the control unit 315 may, for example, notify a monitoring system managed by the manufacturer of the storage battery system 1 or a maintenance provider of the information. This allows the manufacturer or the maintenance provider to recognize that the voltage sensor 311 has failed.

Embodiment 2

Figure 4:
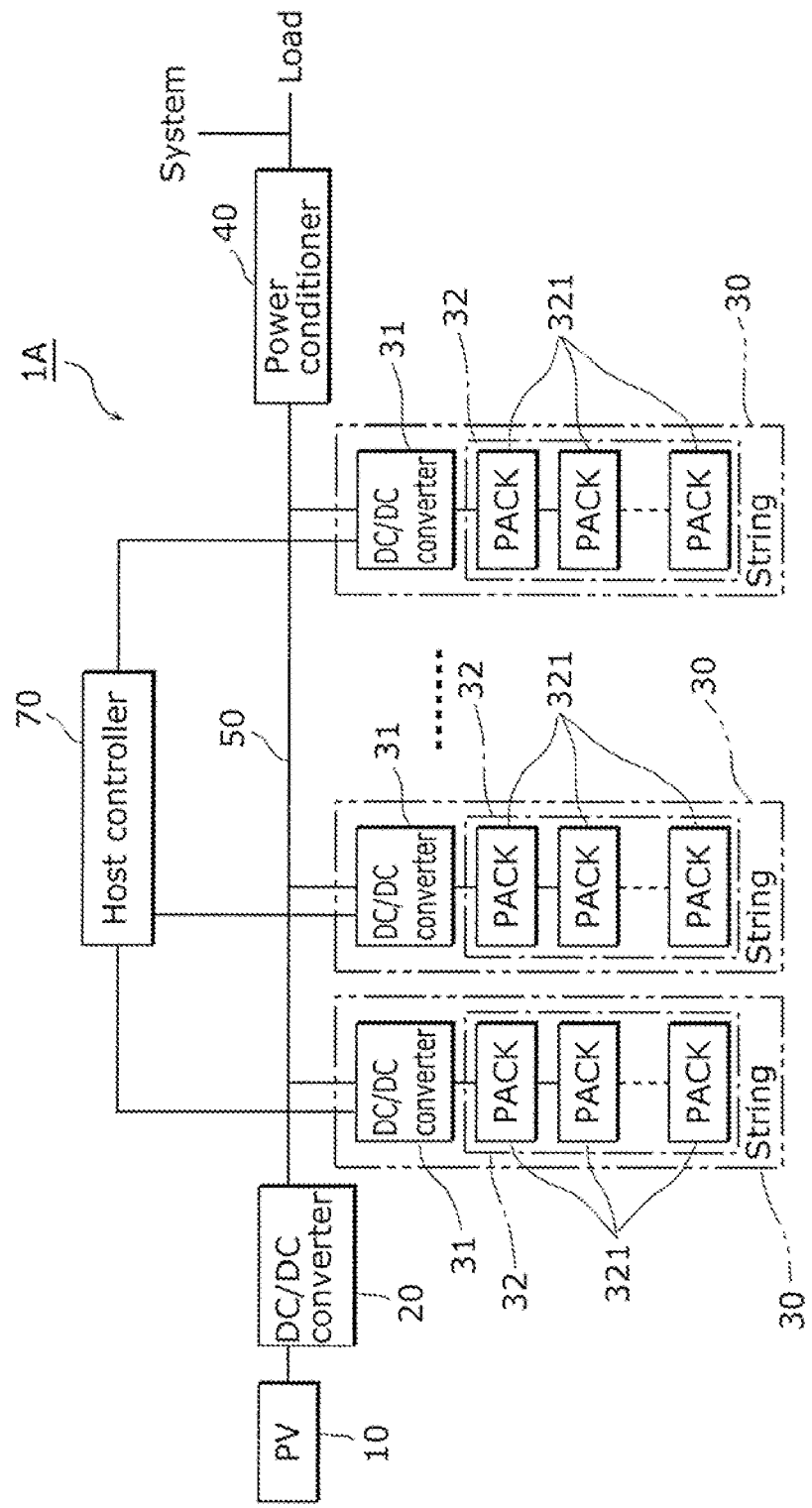
FIG. 4 is a block diagram showing a configuration of the storage battery system according to Embodiment 2.

FIG. 4 is a block diagram showing a configuration of the storage battery system according to Embodiment 2. It should be noted that in the following embodiments, the structural elements same as those described in Embodiment 1 are given the same reference signs, and the explanation will be omitted.

As FIG. 4 shows, a storage battery system 1A according to the present embodiment further includes a host controller 70 which is, for example, a battery management unit (BMU). The host controller 70 broadcasts a synchronization request signal to the voltage sensors 311 of the DC-DC converters 31. The synchronization request signal requests for synchronization of (i) the timing at which a voltage value is detected by the voltage sensor 311 of a particular DC-DC, converter 31 and (ii) the timing at which voltage values are detected by the voltage sensors 311 of the DC-DC converters 31 other than the particular DC-DC converter 31.

Figure 5:
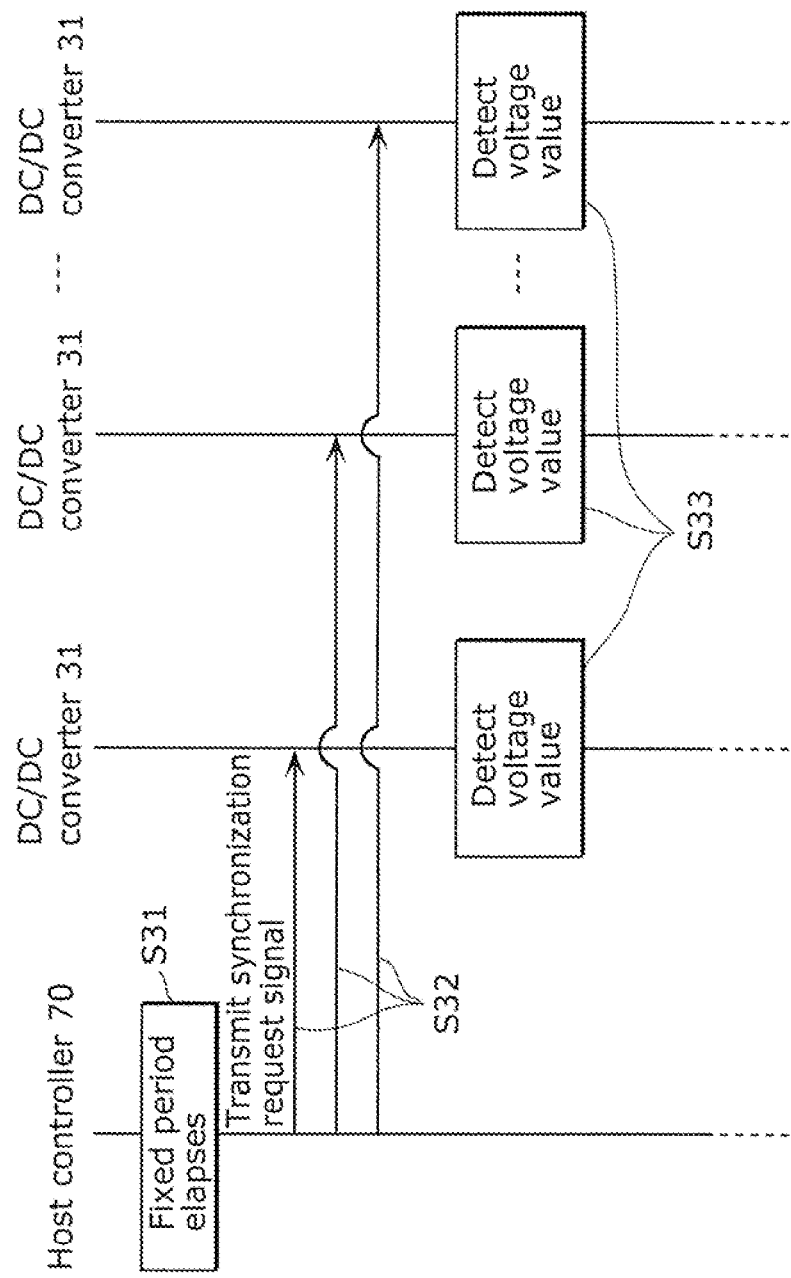
FIG. 5 is a sequence diagram showing part of the procedure of the method of controlling the storage battery system according to Embodiment 2.

FIG. 5 is a sequence diagram showing part of the procedure of the method of controlling the storage battery system according to Embodiment 2. When a fixed period elapses (S31), the host controller 70 broadcasts the synchronization request signal to the voltage sensors 311 of the DC-DC converters 31 (S32). The voltage sensors 311 of the DC-DC converters 31 each receive the synchronization request signal, and detect a voltage value by synchronized timing (S33). After that, processing similar to the processing described in Embodiment 1 is performed in each of the DC-DC converters 31.

In the present embodiment, timings at which the voltage sensors 311 of the DC-DC converters 31 detect voltage values are synchronized. Therefore, for example, even when a voltage value in the DC bus 50 varies as time elapses, it is possible to suppress variations in voltage values detected by the voltage sensors 311 of the DC-DC converters 31.

Embodiment 3

Figure 6:
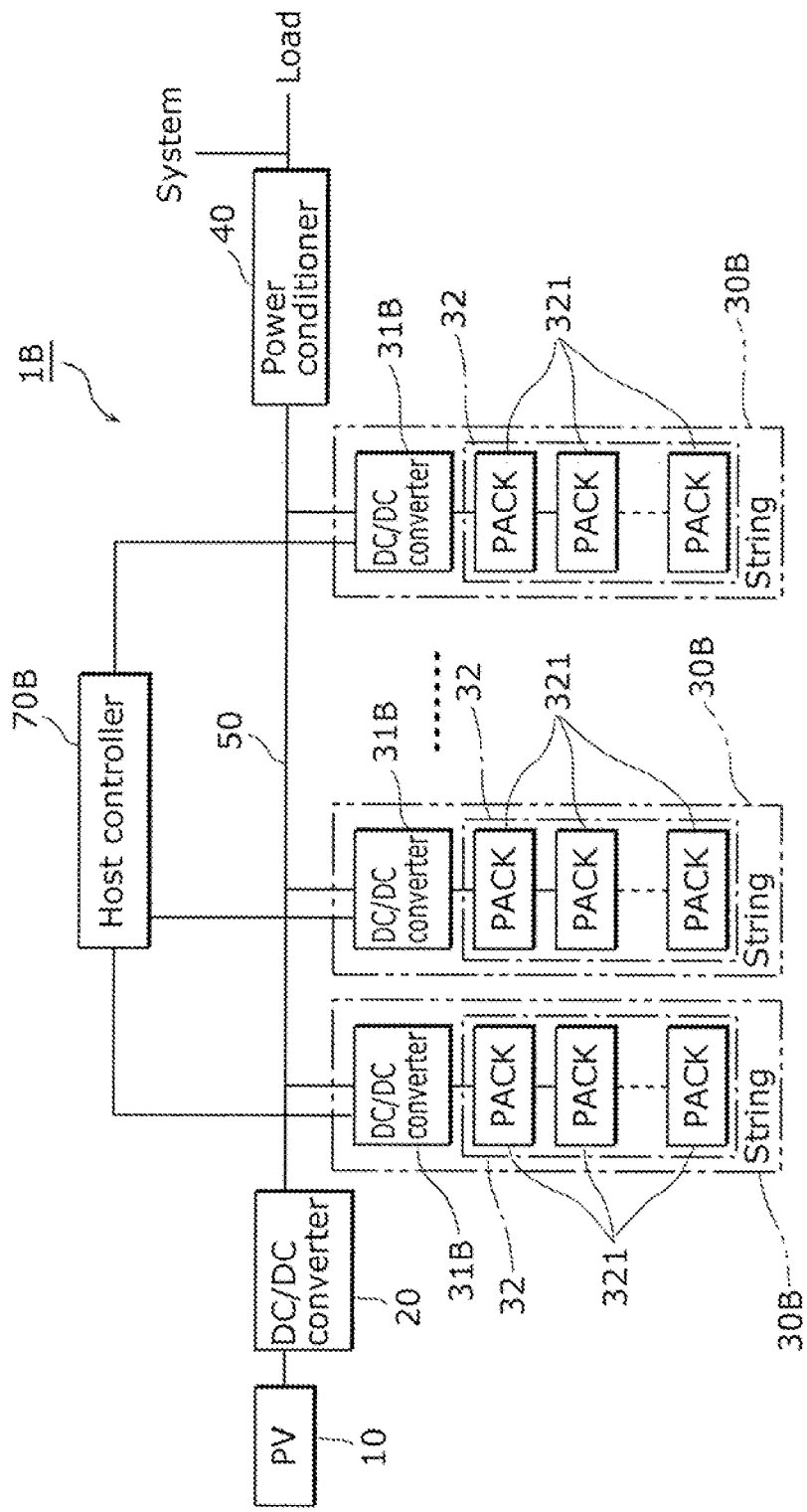
FIG. 6 is a block diagram showing a configuration of the storage battery system according to Embodiment 3.
Figure 7:
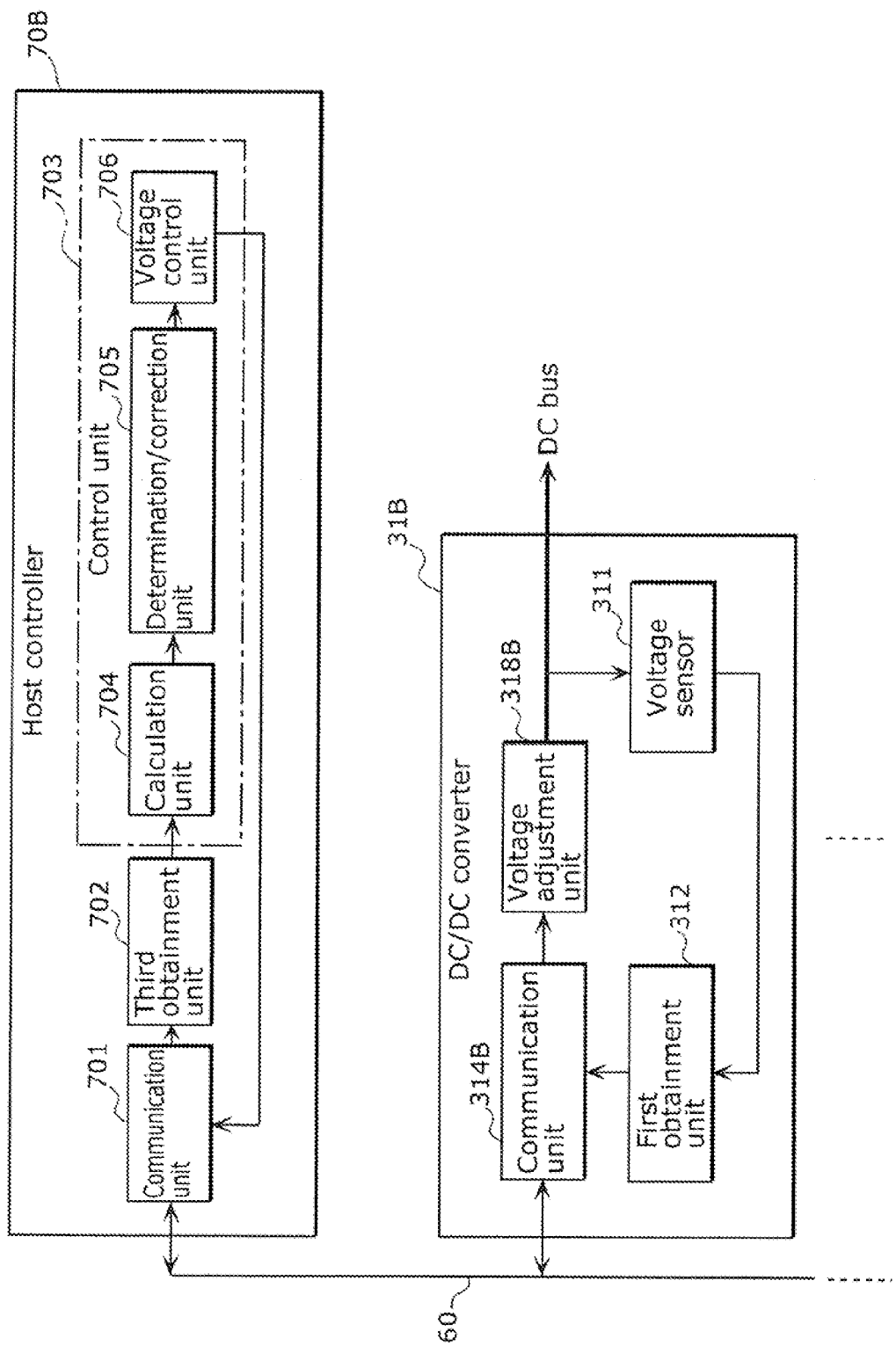
FIG. 7 is a block diagram showing the functional configurations of the host controller and the DC-DC converter in FIG. 6.

FIG. 6 is a block diagram showing a configuration of the storage battery system according to Embodiment 3. FIG. 7 is a block diagram showing the functional configurations of the host controller and the DC-DC converter in FIG. 6.

As FIG. 6 shows, a storage battery system 16 according to the present embodiment includes a host controller 70B for controlling each of DC-DC converters 31B. As FIG. 7 shows, the host controller 706 which is, for example, BMU, and includes a communication unit 701, a third obtainment unit 702, and a control unit 703.

The communication unit 701 transmits and receives data or the like between the host controller 70B and each of the DC-DC converters 31B. Specifically, the communication unit 701 receives voltage values obtained by the first obtainment units 312 of the DC-DC converters 31B, and transmits a voltage control signal (which will be described later) to the communication units 314 of the DC-DC converters 31B.

The third obtainment unit 702 obtains voltage values received by the communication unit 701, i.e., the voltage values obtained by the first obtainment units 312 of the DC-DC converters 31B.

The control unit 703 includes a calculation unit 704, a determination/correction unit 705, and a voltage control unit 706.

The calculation unit 704 calculates, as a statistic, the average value of voltage values detected by the voltage sensors 311 of the DC-DC converters 31B other than a particular DC-DC converter 31B, based on the voltage values obtained by the third obtainment unit 702. It should be noted that the calculation unit 704 can calculate, as a statistic, the average value of the voltage values detected by the voltage sensors 311 of all the DC-DC converters 31B.

The determination/correction unit 705 includes (i) a failure determination function to determine that the voltage sensor 311 of the particular DC-DC converter 31B has failed and (ii) a correction function to correct a voltage value detected by the voltage sensor 311 of the particular DC-DC converter 31B. These failure determination function and correction function are similar to the failure determination function and correction function of the determination/correction unit 317 in Embodiment 1. Therefore, the explanation for these functions will be omitted.

The voltage control unit 706 controls the DC-DC converters 31B by transmitting a voltage control signal to the DC-DC converters 31B via the communication unit 701. The voltage control signal instructs the DC-DC converters 31B as to based on what voltage value the DC-DC converters 31B should control the amount of charge in and the amount of discharge from each of the battery packs 321.

As FIG. 6 shows, strings 30B each include the DC-DC converter 31B. As FIG. 7 shows, the DC-DC converters 31B each include a voltage sensor 311, a first obtainment unit 312, a communication unit 314B, and a voltage adjustment unit 318B. The configurations of the voltage sensor 311 and the first obtainment unit 312 are respectively similar to the configurations of the voltage sensor 311 and the first obtainment unit 312 in Embodiment 1. Therefore, the explanation for these configurations will be omitted.

The communication unit 314B transmits a voltage value obtained by the first obtainment unit 312 of the DC-DC converter 31B to the host controller 70B, and receives a voltage control signal from the host controller 70B.

The voltage adjustment unit 318B adjusts a voltage value at the connection point between the DC-DC converter 31B and a DC bus 50 to be approximated to a predetermined target value, based on the voltage control signal received by the communication unit 314B.

It should be noted that the DC-DC converters 31B each do not include the second obtainment unit 313, the calculation unit 316, and the determination/correction unit 317 described in Embodiment 1.

Figure 8:
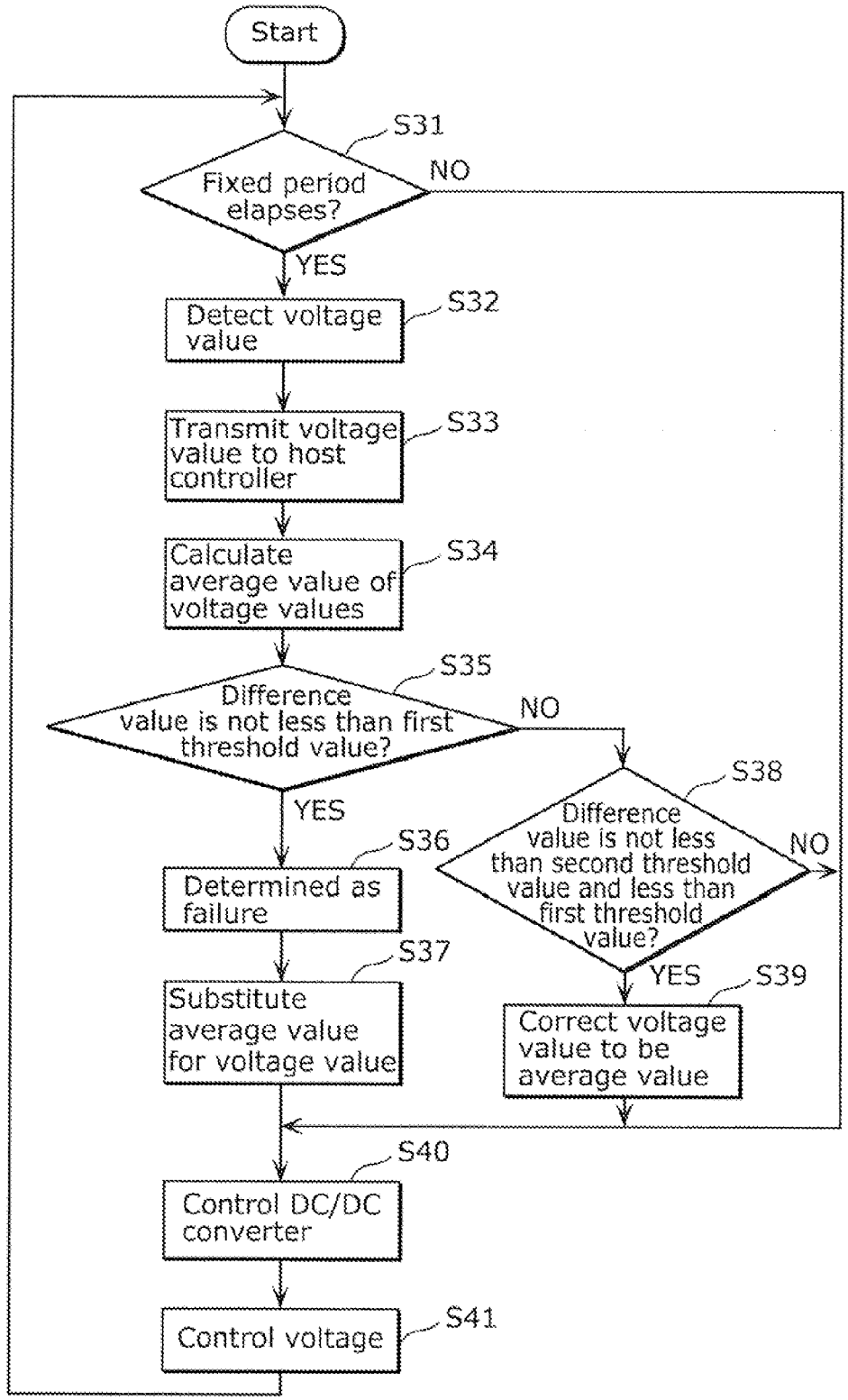
FIG. 8 is a flowchart showing the procedure of the method of controlling the storage battery system according to Embodiment 3.

The following describes the procedure of the method of controlling the storage battery system 1B in the present embodiment. FIG. 8 is a flowchart showing the procedure of the method of controlling the storage battery system according to Embodiment 3.

When a fixed period elapse (Yes in S31), the voltage sensor 311 of each of the DC-DC converters 31B detects a voltage value at the connection point between the DC-DC converter 31B and the DC bus 50 (detection step) (S32). The first obtainment unit 312 of each of the DC-DC converters 31B obtains the voltage value detected by the voltage sensor 311 of the DC-DC converter 31B. The voltage value obtained by the first obtainment unit 312 is transmitted to the host controller 70B via the communication unit 314B (S33).

The third obtainment unit 702 of the host controller 70B obtains voltage values transmitted from the DC-DC converters 31B. The calculation unit 704 calculates the average value of voltage values detected by the voltage sensors 311 of the DC-DC converters 31B other than a particular DC-DC converter 31B, based on the voltage values obtained by the third obtainment unit 702 (S34). The determination/correction unit 705 calculates a difference value between the calculated average value and a voltage value obtained by the first obtainment unit 312 of the particular DC-DC converter 31B.

When the difference value is less than a second threshold value (No in S35 and No in S38), the voltage control unit 706 controls the DC-DC converters 31B by transmitting a voltage control signal to the DC-DC converters 31B via the communication unit 701 (control step) (S40). In this case, the voltage control signal instructs each of the DC-DC converters 31B to control based on the voltage value detected by the voltage sensor 311 of the DC-DC converter 31B. The voltage adjustment unit 318 of each of the DC-DC converters 31B controls the amount of charge in and the amount of discharge from each of the battery packs 321 connected to the DC-DC converter 31B, based on the voltage value obtained by the first obtainment unit 312 of the DC-DC converter 31B (S41). That is, the voltage adjustment unit 318 adjusts a voltage value at the connection point between the DC-DC converter 31B and the DC bus 50 so as to be approximated to the predetermined target value.

Meanwhile, when the difference value is not less than a first threshold value (Yes in S35), the determination/correction unit 705 determines that the voltage sensor 311 of a particular DC-DC converter 31B has failed (S36). The voltage control unit 706 substitutes the average value calculated by the calculation unit 704 for the voltage value detected by the failed voltage sensor 311 (S37). When the voltage control unit 706 controls each of the DC-DC converters 31B by transmitting a voltage control signal to the DC-DC converters 31B via the communication unit 701 (control step) (S40). The voltage control signal in this case is a signal for instructing the particular DC-DC converter 31B to control based on the substituted average value and instructing each of the DC-DC converters 31B other than the particular DC-DC converter 31B to control based on a voltage value detected by the voltage sensor 311 of the DC-DC converter 31B. In this way, the voltage adjustment unit 318 of the particular DC-DC converter 31B temporarily controls the amount of charge in and the amount of discharge from each of the battery packs 321 connected to the particular DC-DC converter 31B, based on the substituted average value (S41). Furthermore, the voltage adjustment unit 318 of each of the DC-DC converters 31B other than the particular DC-DC converter 31B temporarily controls the amount of charge in and the amount of discharge from each of the battery packs 321 connected to the DC-DC converter 31B, based on a voltage value detected by the voltage sensor 311 of the DC-DC converter 31B (S41).

Furthermore, when the difference value is not less than the second threshold value and less than the first threshold value (No in S35 and Yes in S38), the determination/correction unit 705 corrects the voltage value detected by the voltage sensor 311 of the particular DC-DC converter 31B so as to be approximated to the average value (S39). When the voltage control unit 706 controls each of the DC-DC converters 31B by transmitting a voltage control signal to the DC-DC converters 31B via the communication unit 701 (control step) (S40). The voltage control signal in this case is a signal for instructing the particular DC-DC converter 31B to control based on the corrected average value and instructing each of the DC-DC converters 31B other than the particular DC-DC converter 31B to control based on a voltage value detected by the voltage sensor 311 of the DC-DC converter 31B. In this way, the voltage adjustment unit 318 of the particular DC-DC converter 31B controls the amount of charge in and the amount of discharge from each of the battery packs 321 connected to the particular DC-DC converter 31B, based on the corrected average value (S41). Furthermore, the voltage adjustment unit 318 of each of the DC-DC converters 31B other than the particular DC-DC converter 31B controls the amount of charge in and the amount of discharge from each of the battery packs 321 connected to the DC-DC converter 31B, based on a voltage value detected by the voltage sensor 311 of the DC-DC converter 31B (S41).

It should be noted that every time the fixed period elapses, each step of S32 to S41 described above is performed.

It should be noted that in the above embodiments, each structural element may be a dedicated hardware or may be achieved by executing a software program suitable for the each structural element. The each structural element may be realized by a program executing unit such as a CPU or a processor reading and executing the software program recorded on a recording medium such as a hard disk drive or a semiconductor memory. Here, the software program which realizes a storage battery system and others in each of the above embodiments is the following program.

That is, a program causing a computer to execute a method of controlling a storage battery system includes electric storage units electrically connected with a common direct current (DC) bus in parallel, and each including at least one storage battery; and voltage conversion units, each provided between one of the electric storage units and the DC bus, for controlling amounts of charge in and amounts of discharge from the electric storage units, the method including: detecting a voltage value at a connection point between the DC bus and each of the voltage conversion units by a voltage sensor of the voltage conversion unit; obtaining voltage values detected by voltage sensors of the voltage conversion units other than the voltage conversion unit; and when a difference value between (i) a statistic of the voltage values detected in the obtaining and (ii) the voltage value detected in the detecting is not less than a predetermined threshold value, changing the voltage value detected by the voltage sensor of the voltage conversion unit, and controlling an amount of charge in and an amount of discharge from a corresponding one of the electric storage units which is connected to the voltage conversion unit to approximate the changed voltage value to a predetermined target value.

Alternatively, a program causing a computer to execute a method of controlling a storage battery system includes electric storage units electrically connected with a common direct current (DC) bus in parallel, and each including at least one storage battery; and voltage conversion units, each provided between one of the electric storage units and the DC bus, for controlling amounts of charge in and amounts of discharge from the electric storage units, the method including: detecting a voltage value at a connection point between the DC bus and each of the voltage conversion units by a voltage sensor of the voltage conversion unit; and when a difference value between (i) a voltage value detected by the voltage sensor corresponding to a particular voltage conversion unit and (ii) a statistic of voltage values detected by the voltage sensors corresponding to the voltage conversion units other than the particular voltage conversion unit is not less than a predetermined threshold value, changing the voltage value detected by the voltage sensor corresponding to the particular voltage conversion unit, and controlling each of the voltage conversion units to approximate the changed voltage value to a predetermined target value.

The storage battery system and the method of controlling the same according to one or more than one embodiment of the present invention are described above. However, the present invention is not limited to the embodiments. An embodiment obtained by making various modifications which those skilled in the art would conceive to the above embodiments and an embodiment obtained by combining structural elements in different embodiments may be included in the scope of one or more than one aspect of the present invention without departing from the scope of the present invention.

In the above embodiment, the determination/correction unit 317 (705) has the failure determination function and the correction function. However, the determination/correction unit 317 (705) may have either one of these functions. It should be noted that when the determination/correction unit 317 (705) only has the correction function and a difference value is not less than a predetermined threshold value (e.g., 3 V), the determination/correction unit 317 (705) can correct a voltage value detected by the voltage sensor 311.

In Embodiments 1 and 2, the communication unit 314 transmits a voltage value obtained by the first obtainment unit 312 of the DC-DC converter 31 to the communication units 314 of the other DC-DC converters 31. Instead of such configuration, the communication unit 314 may transmit a voltage value corrected by the determination/correction unit 317 of the DC-DC converter 31 to the communication units 314 of the other DC-DC converters 31.

In the above embodiments, the DC-DC converter 31 is a voltage conversion unit. However, AC/DC converter or others can also be the voltage conversion unit.

In the above embodiments, the calculation unit 316 (704) calculates, as a statistic, the average value of voltage values detected by the voltage sensors 311 of all the DC-DC converters 31 (31B). However, other calculation is also possible. For example, the calculation unit 316 (704) can also calculate, as a statistic, the average values of residual voltage values obtained by subtracting the largest and smallest values from the voltage values detected by the voltage sensors 311 of all the DC-DC converters 31 (31B). Alternatively, the calculation unit 316 (704) can set weight coefficients based on the distribution of the voltage values detected by the voltage sensors 311 of all the DC-DC converters 31 (31B), and calculate a statistic using voltage values obtained by multiplying by the weight coefficients.

INDUSTRIAL APPLICABILITY

The present invention is applicable to a storage battery system for controlling the amount of charge in and the amount of discharge from an electric storage unit and the method of controlling the same.

REFERENCE SIGNS LIST 1, 1A, 1B storage battery system
10 PV
20, 31, 31B DC/DC converter
30, 30B string
32 electric storage unit
40 power conditioner
50 DC bus
60 CAN
70, 70B host controller
311 voltage sensor
312 first obtainment unit
313 second obtainment unit
314, 314B, 701 communication unit
315, 703 control unit
316, 704 calculation unit
317, 705 determination/correction unit
318, 318B voltage adjustment unit
321 battery pack
702 third obtainment unit
706 voltage control unit

The invention claimed is:
1. A storage battery system comprising:
electric storage units connected with a common direct current (DC) bus in parallel, and each including at least one storage battery; and
voltage conversion units, each provided between one of the electric storage units and the DC bus, for controlling amounts of charge in and amounts of discharge from the electric storage units, wherein each of the voltage conversion units includes:
a voltage sensor for detecting a voltage value at a connection point between the DC bus and the voltage conversion unit;
a communication unit configured to communicate with the other voltage conversion units;
an obtainment unit configured to obtain, via the communication unit, voltage values detected by the voltage sensors of the other voltage conversion units; and
a control unit configured to, when a difference value between (i) a statistic of the voltage values obtained by the obtainment unit and (ii) the voltage value detected by the voltage sensor is not less than a predetermined threshold value, approximate the voltage value detected by the voltage sensor to a predetermined target value by changing an amount of charge in and an amount of discharge from a corresponding one of the electric storage units.

2. The storage battery system according to claim 1,
wherein when the difference value is not less than the predetermined threshold value, the control unit of each of the voltage conversion units is configured to determine that the voltage sensor of the voltage conversion unit has failed.

3. The storage battery system according to claim 1,
wherein when determining that the voltage sensor of the voltage conversion unit has failed, the control unit of each of the voltage conversion units is configured to change the voltage value detected by the failed voltage sensor by substituting the statistic for the voltage value detected by the failed voltage sensor.

4. The storage battery system according to claim 1,
wherein when the difference value is not less than the predetermined threshold value, the control unit of each of the voltage conversion units is configured to weight the voltage value detected by the voltage sensor of the voltage conversion unit to correct the voltage value to be approximated to the statistic.

5. The storage battery system according to claim 1,
wherein the control unit of each of the voltage conversion units is configured to,
when the difference value is not less than a first threshold value, determine that the voltage sensor of the voltage conversion unit has failed, and substitute the statistic for the voltage value detected by the failed voltage sensor, and
when the difference value is less than the first threshold value and not less than a second threshold value smaller than the first threshold value, correct the voltage value detected by the voltage sensor of the voltage conversion unit to be approximated to the statistic.

6. The storage battery system according to claim 1, further comprising
a host controller which transmits a synchronization request signal for requesting the voltage sensor of each of the voltage conversion units to synchronize (i) a timing at which the voltage sensor of the voltage conversion unit detects a voltage value and (ii) a timing at which the voltage sensors of the other voltage conversion units detect voltage values.

7. The storage battery system according to claim 1,
wherein the statistic is an average value.

8. A method of controlling a storage battery system including electric storage units connected with a common direct current (DC) bus in parallel, and each including at least one storage battery; and voltage conversion units, each provided between one of the electric storage units and the DC bus, for controlling amounts of charge in and amounts of discharge from the electric storage units, the method comprising:
detecting a voltage value at a connection point between the DC bus and each of the voltage conversion units by a voltage sensor of the voltage conversion unit;
obtaining voltage values detected by voltage sensors of the other voltage conversion units; and
when a difference value between (i) a statistic of the voltage values detected in the obtaining and (ii) the voltage value detected in the detecting is not less than a predetermined threshold value, approximating the voltage value detected by the voltage sensor to a predetermined target value by changing an amount of charge in and an amount of discharge from a corresponding one of the electric storage units.

9. A storage battery system comprising:
electric storage units connected with a common direct current (DC) bus in parallel, and each including at least one storage battery;
voltage conversion units, each provided between one of the electric storage units and the DC bus, for controlling amounts of charge in and amounts of discharge from the electric storage units;
voltage sensors each of which detects a voltage value at a connection point between the DC bus and one of the voltage conversion units; and
a control unit configured to control each of the voltage conversion units,
wherein when a difference value between (i) a voltage value detected by the voltage sensor corresponding to a particular voltage conversion unit and (ii) a statistic of voltage values detected by the voltage sensors corresponding to the voltage conversion units other than the particular voltage conversion unit is not less than a predetermined threshold value, the control unit is configured to approximate the voltage value detected by the voltage sensor corresponding to the particular voltage conversion unit to a predetermined target value by controlling each of the voltage conversion units.

10. A method of controlling a storage battery system including electric storage units connected with a common direct current (DC) bus in parallel, and each including at least one storage battery; and voltage conversion units, each provided between one of the electric storage units and the DC bus, for controlling amounts of charge in and amounts of discharge from the electric storage units, the method comprising:
detecting a voltage value at a connection point between the DC bus and each of the voltage conversion units by a voltage sensor of the voltage conversion unit; and
when a difference value between (i) a voltage value detected by the voltage sensor corresponding to a particular voltage conversion unit and (ii) a statistic of voltage values detected by the voltage sensors corresponding to the voltage conversion units other than the particular voltage conversion unit is not less than a predetermined threshold value, approximating the voltage value detected by the voltage sensor corresponding to the particular voltage conversion unit to a predetermined target value by controlling each of the voltage conversion units.

* * * * *